(12) United States Patent
Aliane et al.

(10) Patent No.: US 11,815,400 B2
(45) Date of Patent: Nov. 14, 2023

(54) SENSITIVE PIXEL BASED DETECTION SYSTEM COMPRISING A THERMAL DETECTOR AND A COMPENSATION DEVICE

(71) Applicant: COMMISSARIAT À L'ÉNERGIE ATOMIQUE ET AUX ÉNERGIES ALTERNATIVES, Paris (FR)

(72) Inventors: Abdelkader Aliane, Grenoble (FR); Alain Charpentier, Grenoble (FR)

(73) Assignee: COMMISSARIAT À L'ÉNERGIE ATOMIQUE ET AUX ÉNERGIES ALTERNATIVES, Paris (FR)

( * ) Notice: Subject to any disclaimer, the term of this patent is extended or adjusted under 35 U.S.C. 154(b) by 431 days.

(21) Appl. No.: 17/058,484

(22) PCT Filed: May 28, 2019

(86) PCT No.: PCT/FR2019/051231
§ 371 (c)(1),
(2) Date: Nov. 24, 2020

(87) PCT Pub. No.: WO2019/229353
PCT Pub. Date: Dec. 5, 2019

(65) Prior Publication Data
US 2021/0199509 A1  Jul. 1, 2021

(30) Foreign Application Priority Data
May 30, 2018 (FR) ........................................ 1854635

(51) Int. Cl.
*G01J 5/20*   (2006.01)
*G01J 5/02*   (2022.01)
(Continued)

(52) U.S. Cl.
CPC .................. *G01J 5/20* (2013.01); *G01J 5/024* (2013.01); *G01J 5/045* (2013.01); *G01J 5/064* (2022.01); *G01J 5/80* (2022.01); *H04N 5/33* (2013.01)

(58) Field of Classification Search
CPC .... G01J 5/20; G01J 5/024; G01J 5/045; G01J 5/064; G01J 5/80; G01J 5/10; G01J 5/34; G01J 5/06; H04N 5/33
See application file for complete search history.

(56) References Cited

U.S. PATENT DOCUMENTS 6,287,940 B1  9/2001 Cole et al.
2004/0232337 A1* 11/2004 Vilain ..................... G01J 5/023
250/338.1
(Continued)

FOREIGN PATENT DOCUMENTS

EP  1637854 A2 *  3/2006  ................ G01J 5/20
EP  3 093 633 A1  11/2016
(Continued)

OTHER PUBLICATIONS

International Search Report dated Nov. 13, 2019 in PCT/FR2019/051231 filed on May 28, 2019, citing documents AA-AD and AO-AQ therein, 2 pages.
(Continued)

*Primary Examiner* — Christine S. Kim
(74) *Attorney, Agent, or Firm* — Oblon, McClelland, Maier & Neustadt, L.L.P.

(57) ABSTRACT

A detection system includes a readout substrate, at least one thermal detector associated with a reflector, and at least one compensation device including a compensation transducer in thermal contact with the readout substrate, arranged between the reflector and the readout substrate, and situated
(Continued)

facing the reflector so as to be optically insensitive to the incident electromagnetic radiation.

14 Claims, 8 Drawing Sheets

(51) Int. Cl.
　　　*G01J 5/80* (2022.01)
　　　*G01J 5/04* (2006.01)
　　　*G01J 5/06* (2022.01)
　　　*H04N 5/33* (2023.01)

(56) References Cited

U.S. PATENT DOCUMENTS

| | | |
|---|---|---|
| 2012/0235045 A1 | 9/2012 | Kurashina et al. |
| 2013/0235210 A1 | 9/2013 | Tinkler et al. |
| 2013/0240738 A1* | 9/2013 | Yon ........................ G01J 5/046 250/349 |
| 2019/0271598 A1 | 9/2019 | Yon et al. |

FOREIGN PATENT DOCUMENTS

| | | | |
|---|---|---|---|
| EP | 3093633 A1 * | 11/2016 | ............ G01J 1/0204 |
| FR | 3 056 292 A1 | 3/2018 | |
| JP | 4-355331 A | 12/1992 | |
| TW | 202137531 A * | 10/2021 | .............. G01J 5/024 |
| WO | WO 01/09948 A1 | 2/2001 | |

OTHER PUBLICATIONS

French Search Report and Written Opinion (with translation of categories) dated Feb. 11, 2019 in French Application No. 18 54635 filed on May 30, 2018, citing documents AA-AB, AO-AP and AR therein, 10 pages.

* cited by examiner

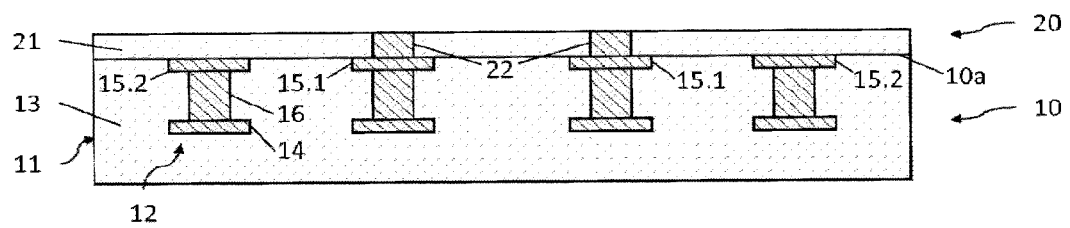
Fig.3A
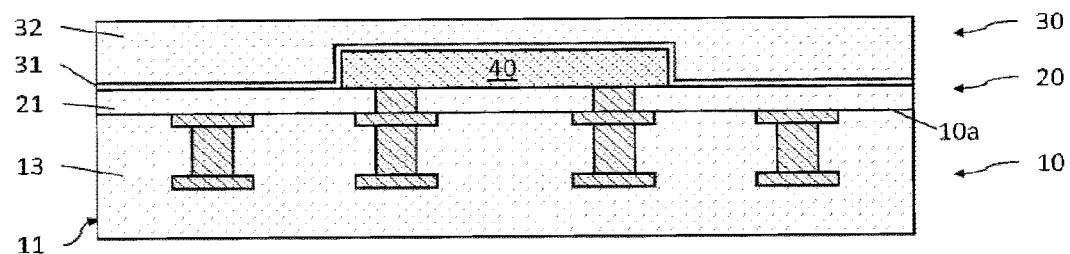
Fig.3B
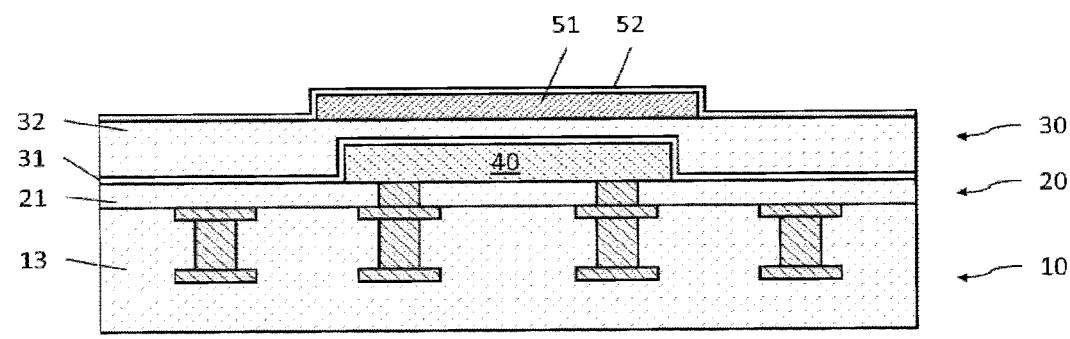
Fig.3C
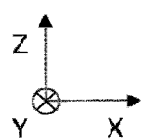

SENSITIVE PIXEL BASED DETECTION SYSTEM COMPRISING A THERMAL DETECTOR AND A COMPENSATION DEVICE

TECHNICAL FIELD

The field of the invention is that of electromagnetic radiation detection devices comprising at least one thermal detector with an absorbent membrane thermally insulated from the substrate, and at least one compensation device. The invention applies notably to the field of infrared or terahertz imaging, thermography, or even gas detection.

PRIOR ART

An electromagnetic radiation detection system may comprise a matrix of sensitive pixels each containing a thermal detector with an absorbent membrane thermally insulated from the substrate. The absorbent membrane comprises an absorber for absorbing the electromagnetic radiation to be detected, associated with a thermometric transducer an electrical property of which varies in terms of intensity on the basis of the heating thereof.

Since the temperature of the thermometric transducer is however greatly dependent on its environment, the absorbent membrane is usually thermally insulated from the substrate and from the readout circuit, which is arranged in the substrate. The absorbent membrane is thus generally suspended above the substrate by anchoring pillars, and is thermally insulated therefrom by support and thermal insulation arms. These anchoring pillars and insulation arms also have an electrical function by creating the electrical connection between the suspended membrane and the readout circuit arranged in the substrate.

However, when reading an electrical signal from the thermal detector when the electromagnetic radiation is absorbed, the useful part of the response signal from the thermometric transducer associated with the heating thereof, induced by the absorption of the electromagnetic radiation to be detected, remains low, for example less than 10%, or even 1% of the response signal. Therefore, the detection system usually comprises a compensation device intended to measure the non-useful part of the electrical signal, also called common mode, associated with the environment of the thermal detector, which is then subtracted from the response signal in order to deduce the useful part therefrom.

The detection system, in particular when it operates in 'rolling shutter' mode, may then comprise a matrix of sensitive pixels, and a compensation device and a CTIA integrator arranged at the base of each column of pixels. During operation, the matrix of sensitive pixels is read row by row. The integrator receives the response signal $I_d$ from the thermal detector and subtracts therefrom the common-mode electrical signal $I_c$ measured by the corresponding compensation device. The non-useful part contained in the response signal $I_d$ is thus compensated by the common mode $I_c$. The useful part $I_d$-$I_c$ associated with the absorption of the electromagnetic radiation to be detected is thus obtained, without it being necessary to specifically regulate the temperature of the substrate.

FIG. 1 illustrates one example of a compensation device 30 as described in document EP2840370. The compensation device 30 has a structure similar to that of a thermal detector, the absorbent membrane 53 however being thermally linked to the readout substrate 10 by way of rods 2 connecting the membrane 53 to the readout substrate 10 in order to create a thermal short circuit. In addition, the absorbent membrane 53 is made optically insensitive to the incident electromagnetic radiation.

However, there is a need to have a detection system having an increased fill factor, this factor being defined as the ratio of the surface area of the absorbent membrane to the total surface area of the sensitive pixel, in a plane parallel to the plane of the substrate, while taking into account the presence of the compensation device. There is also a need to have a detection system that has more accurate determination of the useful part of the response signal supplied by each thermal detector.

Documents JPH04355331 and EP3093633 describe compensation devices for pyroelectric thermal detectors, that is to say for which the thermometric transducer is a capacitor. These compensation devices comprise a capacitor and are intended to compensate piezoelectric noise and not the common mode. To this end, the compensation capacitor is generally thermally insulated from the substrate so as to exhibit properties identical to those of the detection capacitor (as explicitly indicated in document EP3093633), but does not receive incident light. Specifically, it is not possible to dissociate the pyroelectric effect from a piezoelectric effect for the majority of materials used in pyroelectric detectors, thereby notably posing a problem as soon as there are mechanical vibrations. It should also be noted that temperature fluctuations due to the absorption of the incident light flux also generate pyroelectric and piezoelectric charges. To eliminate this piezoelectric noise, it is known practice to connect, in series, a pyroelectric compensation device that is identical in all respects to the pyroelectric detector but that is reverse-biased.

DISCLOSURE OF THE INVENTION

The object of the invention is to at least partly rectify the drawbacks of the prior art. To this end, the subject of the invention is a system for detecting electromagnetic radiation, comprising:
- a substrate, called readout substrate;
- at least one thermal detector, comprising:
  - an absorbent membrane for absorbing the electromagnetic radiation, thermally insulated from the readout substrate, and comprising a thermometric detection transducer;
  - a reflector for reflecting the electromagnetic radiation, arranged between the absorbent membrane and the readout substrate;
- at least one compensation device, comprising a thermometric compensation transducer, in thermal contact with the readout substrate;
- a readout circuit, arranged in the readout substrate, and designed to apply an electrical signal to the thermal detector and to the compensation device.

According to the invention, the thermometric compensation transducer is arranged between the reflector and the readout substrate, and situated facing the reflector so as to be optically insensitive to the incident electromagnetic radiation.

Moreover, the thermometric and compensation transducers are chosen from among a p-n junction or PIN diode, a field-effect transistor or a thermistor material. The invention thus relates to thermal detectors whose compensation device makes it possible to subtract the common mode from the measured signal. To this end, the thermometric transducer is in thermal contact with the readout substrate. The invention thus differs, in terms of its structure and in terms of the purpose of the compensation device, from the abovementioned examples of pyroelectric detectors in which the compensation device is intended to eliminate piezoelectric noise from the measured signal and not the common mode.

Some preferred but non-limiting aspects of this detection system are as follows.

The reflector may cover the thermometric compensation transducer. In other words, it has a surface extent, in a plane parallel to the main plane of the readout substrate, that is able to cover the thermometric compensation transducer.

The thermometric compensation transducer may be in contact with the readout substrate through at least one insulating layer made from a dielectric material having a thermal conductivity substantially equal to that of the readout substrate.

The thermometric compensation transducer may be surrounded, in a plane parallel to the main plane of the readout substrate, by an insulating layer made from a dielectric material having a thermal conductivity substantially equal to that of the readout substrate.

In this case, the reflector may rest on an insulating layer made from a dielectric material having a thermal conductivity substantially equal to that of the readout substrate and that covers the thermometric compensation transducer.

The thermometric compensation and detection transducers may be structurally identical.

The thermometric compensation and detection transducers may be connected to the readout circuit via conductive pads extending substantially orthogonally to the main plane of the readout substrate, the conductive pads for connecting the thermometric detection transducer being substantially coaxial with the conductive pads for connecting the thermometric compensation transducer, the conductive pads for connecting the thermometric detection transducer being electrically connected to anchoring pillars suspending the absorbent membrane via at least one lateral connecting arm extending in a plane parallel to the main plane of the readout substrate.

The conductive pads for connecting the thermometric detection transducer may each have a height substantially equal to that of the coaxial conductive pad for connecting the thermometric compensation transducer.

The thermometric compensation and detection transducers may be field-effect transistors each comprising a semiconductor portion forming a source, a channel and a drain, and a conductive layer forming a gate, which is separated from the channel by an insulating layer forming a gate oxide, each gate being situated, with respect to the corresponding semiconductor portion, on the side of the readout substrate.

The thermometric compensation and detection transducers may be connected to the readout circuit via conductive pads extending substantially orthogonally to the main plane of the readout substrate, and each connecting a source, a drain or a gate.

The invention also relates to a method for manufacturing a detection system according to any one of the above features, the thermometric compensation and detection transducers being thermistor materials, comprising the following steps:
producing a readout substrate;
producing the compensation device, from an upper face of the readout substrate;
producing the reflector, from an upper face of the compensation device;
producing the absorbent membrane of the thermal detector, from an upper face of the reflector.

The invention also relates to a method for manufacturing a detection system according to any one of the above features, the thermometric compensation and detection transducers being p-n junction or PIN diodes or field-effect transistors, comprising the following steps:
producing the readout substrate;
producing a functionalized substrate, called compensation substrate, comprising the thermometric compensation transducer;
fastening the functionalized compensation substrate to the readout substrate by bonding;
producing a functionalized substrate, called detection substrate, comprising the thermometric detection transducer;
fastening the functionalized detection substrate to the previously obtained structure by bonding.

The readout, compensation and detection substrates may be fastened in pairs, through mixed bonding, at faces of said functionalized substrates that are defined by at least one surface of a dielectric material, and at least one surface of a metal material.

The invention also relates to a method for manufacturing a detection system according to any one of the above features, the thermometric compensation transducer being a thermistor material, and the thermometric detection transducer being a p-n junction or PIN diode or a field-effect transistor, comprising the following steps:
producing the readout substrate;
producing the compensation device, from an upper face of the readout substrate;
producing an optical spacer interlayer comprising the reflector, from an upper face of the compensation device;
producing a functionalized substrate, called detection substrate, comprising the thermometric detection transducer;
fastening the functionalized detection substrate to the previously obtained structure by bonding.

BRIEF DESCRIPTION OF THE DRAWINGS

Other aspects, aims, advantages and features of the invention will become more clearly apparent on reading the following detailed description of preferred embodiments thereof, given by way of non-limiting example and with reference to the appended drawings, in which:

FIGS. 3A to 3F illustrate various steps of a method for manufacturing the detection system according to the first embodiment;

DETAILED DISCLOSURE OF PARTICULAR EMBODIMENTS

In the figures and in the remainder of the description, the same references represent identical or similar elements. In addition, the various elements are not shown to scale so as to enhance the clarity of the figures. Furthermore, the various embodiments and variants are not mutually exclusive and may be combined with one another. Unless otherwise indicated, the terms "substantially", "approximately" and "of" the order of mean to within 10%, and preferably to within 5%. Furthermore, the expression "comprising a/an" should be understood as "comprising at least one", unless otherwise indicated.

The invention relates to a system for detecting electromagnetic radiation, for example infrared or terahertz radiation. The detection system may thus be particularly suitable for detecting infrared radiation in the LWIR (Long Wavelength Infrared) range, the wavelength of which is between approximately 8 µm and 14 µm. It specifically comprises a quarter-wave interference cavity formed between an absorbent membrane and a reflector, thus making it possible to maximize the absorption of the infrared radiation to be detected.

The detection system comprises at least one sensitive pixel, and preferably a matrix of sensitive pixels. A sensitive pixel is formed of a thermal detector intended to absorb the electromagnetic radiation of interest, and of a compensation device intended to measure the common mode of the sensitive pixel. The compensation device may also be called a reference device or a skimming device. The detection device and the compensation device rest on a functionalized substrate containing the control and readout circuit.

The thermal detector comprises a thermometric transducer, called detection transducer, situated in an absorbent membrane thermally insulated from the substrate. Thermometric transducer is understood here to mean an element having an electrical property that varies with the heating thereof. Such a thermometric transducer may be a thermistor formed for example of a layer of vanadium oxide or titanium oxide, or of an amorphous silicon layer, a (p-n junction or PIN) diode, or even a metal-oxide semiconductor field-effect transistor (MOSFET).

The compensation device comprises a thermometric transducer, called compensation transducer, which is thermally linked to the substrate, that is to say it is in thermal contact therewith. In other words, the thermometric compensation transducer has a temperature substantially equal to that of the substrate and therefore to that of the readout circuit.

According to the invention, the thermometric compensation transducer is situated underneath the reflector of the thermal detector, that is to say between the reflector and the substrate. More precisely, it is arranged facing the reflector so as to be optically insensitive to the electromagnetic radiation to be detected, while having an improved thermal link to the substrate.

Figure 1:
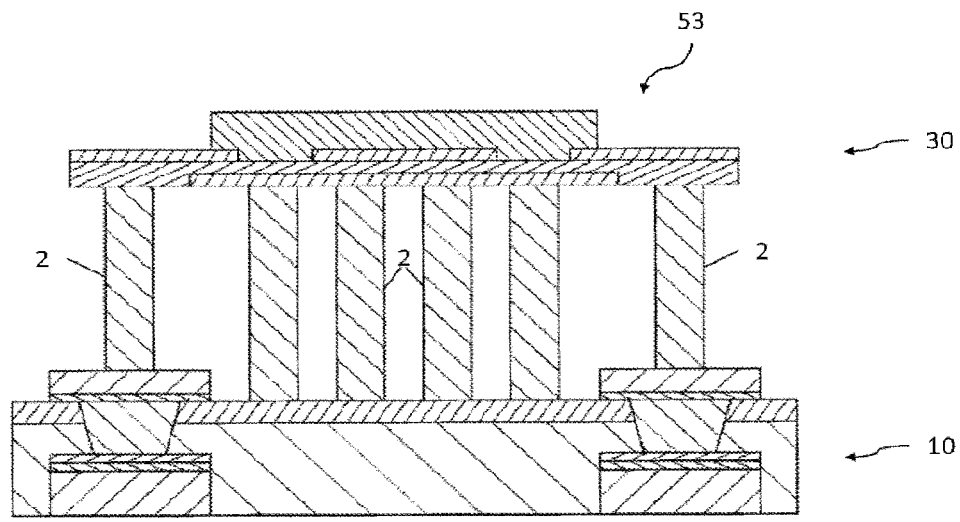
FIG. 1, already described, is a schematic and partial cross-sectional view of a compensation device according to one example from the prior art.
Figure 2:
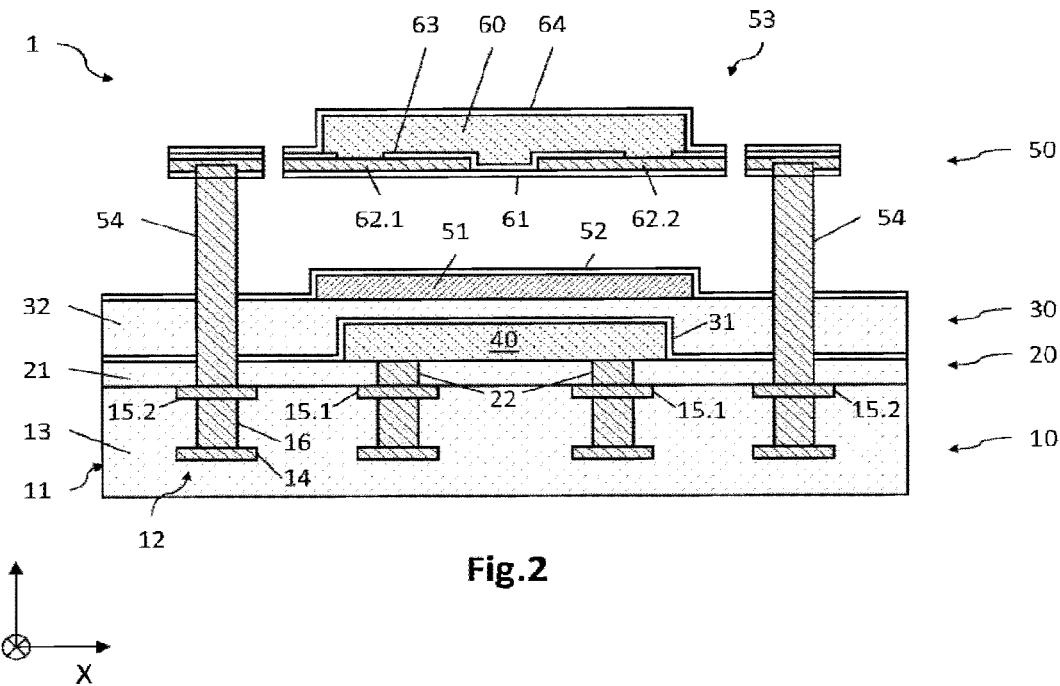
FIG. 2 is a schematic and partial cross-sectional view of a detection system according to a first embodiment.

FIG. 2 is a schematic and partial cross-sectional view of a detection system 1 according to a first embodiment. In this example, the thermometric compensation 40 and detection 60 transducers are made from a thermistor material. This detection system 1 may operate both in row-by-row read mode (rolling shutter mode) and in simultaneous read mode on the sensitive pixels (snapshot mode). It preferably operates in rolling shutter mode, notably because the electric currents associated with the reading of the thermal detector 50 are generally of the order of one microampere.

A definition is given here and for the remainder of the description of an orthogonal three-dimensional direct reference frame (X, Y, Z), in which the plane (X, Y) is substantially parallel to the main plane of the readout substrate 10 of the detection system 1, and where the Z axis is oriented in a direction substantially orthogonal to the main plane of the readout substrate 10 and oriented toward the absorbent membrane 53. In the remainder of the description, the terms "lower" and "upper" are understood to relate to an increasing position when moving away from the substrate in the +Z direction.

The detection system 1 comprises a functionalized substrate 10, called readout substrate, in this example made from silicon, comprising an electronic circuit 12 for controlling and reading the thermal detector 50 and the compensation device 30.

The readout circuit 12 here is in the form of a CMOS integrated circuit situated in a support substrate 11. It comprises portions 14, 15 of conductive lines, for example metal ones, separated from one another by a dielectric material 13, for example a mineral material based on silicon such as a silicon oxide $SiO_x$, a silicon nitride $SiN_x$, or alloys thereof. It may also comprise active electronic elements (not shown), for example diodes, transistors, capacitors, resistors, etc., connected by electrical interconnections to the thermal detector and to the compensation device, on the one hand, and to a connection pad (not shown), on the other hand, the latter being intended to electrically connect the detection system 1 to an external electronic device.

The readout substrate 10 here has an upper face 10a formed notably by a surface of an inter-metal insulating layer 13 and a surface of conductive portions 15 of the last electrical interconnection level, these conductive portions 15 being intended to connect the thermal detector 50 and the compensation device 30 to the readout circuit 12.

By way of illustration, the conductive portions 14, 15 and the conductive vias 16 may be made for example from copper, aluminum or tungsten. The copper or the tungsten may possibly be situated between sublayers of titanium nitride, tantalum nitride or the like. The inter-metal insulating layer or layers 13 may be made from a mineral material based on silicon, for example a silicon oxide $SiO_x$ or a silicon nitride SiN, or even an alloy based on silicon oxide having a low relative permittivity, such as SiOF, SiOC, SiOCH, etc.

The detection system 1 may comprise a connection interlayer 20 formed of an insulating layer 21 made from at least one dielectric material, for example a silicon oxide, and conductive pads 22 intended to create the electrical connection between the compensation transducer 40 and the conductive portions 15.1. The conductive pads 22 are non-blind and open out onto the two opposing faces of the interlayer 20. The interlayer 20 is also passed through by anchoring pillars 54 suspending the absorbent membrane 53, which anchoring pillars 54 are in electrical contact with the conductive portions 15.2. The insulating layer 21 preferably has a thermal conductivity substantially equal to that of the readout substrate 10, so as to improve the thermal link between the compensation transducer 40 and said readout substrate.

The compensation device 30 comprises a thermometric compensation transducer 40, formed here of a portion of a thermistor material such as amorphous silicon, a vanadium oxide or titanium oxide, or any other equivalent material. The compensation transducer 40 is in contact, at two ends in the XY plane, with the conductive pads 22 so as to allow it to be electrically biased by the readout circuit 12. It is coated here with a protective thin film 31 (optional) that extends entirely over the interlayer 20 and the compensation transducer 40. An insulating encapsulating layer 32, made from a dielectric material such as a silicon oxide, covers the protective thin film 31 and therefore covers the compensation transducer 40 and the interlayer 20. It has a preferably substantially planar upper face. The insulating layer 32 preferably has a thermal conductivity substantially equal to that of the readout substrate 12 and in particular to the upper layers of the readout substrate 10, for example of the order of 130 W/m·K, which is the thermal conductivity of silicon, so as to improve the thermal link between the compensation transducer 40 and said readout substrate.

The compensation transducer 40 is thus situated in the sensitive pixel and not outside it. It is electrically connected to the readout circuit 12, and has an improved thermal link to the readout substrate 10. In other words, it is brought to a temperature substantially equal to a local temperature of the readout substrate 10. The local temperature here is the temperature of the readout substrate 10 at the sensitive pixel in question. The thermal link is further improved when the compensation transducer 40 is encapsulated in insulating layers 21 and 32 having a thermal conductivity substantially equal to that of the readout substrate 10.

In this example, the compensation transducer 40 is biased via dedicated conductive portions 15.1, separate from those 15.2 for biasing the detection transducer 60. As a variant, one of the conductive portions 15 may be shared in order to apply the same electrical potential to the compensation transducer 40 and to the detection transducer 60.

Moreover, the compensation device 30, and in particular the compensation transducer 40 thereof, is advantageously dimensioned so that it has geometric properties substantially identical to those of the thermal detector 50 and has good thermal conductivity to the substrate 10, and transparency to infrared radiation. This compensation device makes it possible to reduce the heating of the bolometer during biasing and reduces the dependence of the system on the ambient temperature.

The thermal detector 50 here comprises a reflector 51 and an absorbent membrane 53 that together define a quarter-wave interference optical cavity, thus making it possible to maximize the absorption of the electromagnetic radiation to be detected by the absorbent membrane 53.

The reflector 51 is formed of a portion of reflective material, for example made of metal, resting on the insulating encapsulating layer 32 of the compensation device 30. It is arranged so as to make the compensation transducer 40 insensitive to the incident electromagnetic radiation. It is thus situated facing, about the Z axis, the compensation transducer 40, and preferably has a surface area, in the XY plane, substantially equal to or greater than that of the compensation transducer 40. It is coated here with an etch stop thin film 52 that extends completely over the insulating encapsulating layer 32 and over the reflector 51. This etch stop layer 52 is required notably in order to protect the underlying insulating layers 13, 21, 32 made for example from silicon oxide when the absorbent membrane 53 is suspended, when this is performed by wet etching of a mineral sacrificial layer. As a variant, the etch stop layer 52 may extend continuously over the upper face of the insulating encapsulating layer 32, and may then be locally coated by the reflector 51.

The thermal detector 50 comprises an absorbent membrane 53 suspended above the readout substrate 10 and the reflector 51 via anchoring pillars 54, and thermally insulated from the readout substrate 10 by holding arms (not shown). The absorbent membrane 53 comprises an absorber for absorbing the electromagnetic radiation to be detected, associated with a thermometric detection transducer 60.

The absorbent membrane 53 here is formed, as is conventional, of a stack of a lower insulating layer 61 made from a dielectric material, two electrodes 62.1, 62.2 that are electrically insulated from one another by a lateral spacing, an intermediate insulating layer 63 made from a dielectric material and covering the electrodes 62.1, 62.2 and the lateral spacing, apart from at two apertures opening out onto the electrodes 62.1, 62.2, a portion of a thermistor material 60, for example amorphous silicon or a vanadium oxide or titanium oxide. The thermistor portion 60 is in contact with the two electrodes 62.1, 62.2 via the apertures. An upper insulating layer 64 covers the thermistor portion 60. The absorber is formed here by the electrodes 62.1, 62.2, which are made from at least one metal material.

The absorbent membrane 53 is suspended here above the reflector 51 by the anchoring pillars 54, which extend to the conductive portions 15.2. The distance along the Z axis between the absorbent membrane 53 and the reflector 51 is tailored so as to form the quarter-wave interference cavity.

The detection system 1 thus comprises at least one sensitive pixel containing a thermal detector 50 and a compensation device 30 that are arranged mutually vertically along the Z axis. The vertical arrangement relates more specifically to the absorbent membrane 53 containing the detection transducer 60, the reflector 51, and the compensation transducer 40. The fill factor is thus particularly low insofar as the compensation device 30 does not occupy substantially any additional surface area than that already occupied by the thermal detector 50.

In addition, due to the fact that the compensation transducer 40 is arranged between the reflector 51 and the readout substrate 10, and is in thermal contact therewith, it is thus made insensitive to the incident electromagnetic radiation while at the same time having an improved thermal link to the readout substrate 10. The thermal link is all the more effective the closer the compensation transducer 40 is situated to the readout substrate 10. In addition, it preferably rests on an insulating layer 21 that is in contact with the readout substrate 10, and has a thermal conductivity substantially equal to that of said readout substrate. In addition, it is preferably encapsulated in an insulating layer 32 also having a thermal conductivity substantially equal to that of the readout substrate 10.

Moreover, since the compensation transducer 40 is situated facing the detection transducer 60 in the sensitive pixel and has an improved thermal link to the readout substrate 10, it therefore has a temperature substantially equal to the local temperature of the readout substrate 10 in the sensitive pixel, and therefore makes it possible to measure the effective common mode of the sensitive pixel in question. The useful part of the electrical signal supplied by the thermal detector 50 may then be determined with great accuracy, insofar as the non-useful part is compensated by the effective common mode of the sensitive pixel, which is effectively measured by the compensation device.

FIGS. 3A to 3F illustrate various steps of a method for manufacturing the detection system 1 according to the first embodiment. In the context of this method, the compensation device 30 as well as the thermal detector 50 are produced through deposition, photolithography and etching steps, directly from the readout substrate 10 (method called above IC). In other words, this is a method comprising a continuous sequence of microelectronic production operations performed on a single support substrate 11. The method therefore does not comprise any steps of transferring and bonding functionalized substrates to one another, unlike the manufacturing method according to the second embodiment described further below.

With reference to FIG. 3A, a functionalized substrate, called readout substrate 10, is produced, formed of a support substrate 11 containing the readout circuit 12 designed to control and read the compensation device and the thermal detector. The readout circuit 12 thus comprises conductive portions 15.1, 15.2 that are flush with the upper face 10a of the readout substrate 10, which is substantially planar. The conductive portions 14, 15 and the conductive vias 16 may be made from copper, aluminum and/or tungsten, inter alia, for example using a damascene method in which trenches formed in the inter-metal insulating layer 13 are filled. The conductive portions 15.1, 15.2 may be made flush with the upper face 10a of the readout substrate 10 using a chemical-mechanical polishing (CMP) technique.

The compensation device 30 is then produced directly from the upper face 10a of the readout substrate 10. To this end, it is possible to produce a connection interlayer 20 beforehand. An insulating layer 21 made from a dielectric material, for example a silicon oxide, is thus deposited so as to continuously cover the upper face 10a of the readout substrate 10. The dielectric material is advantageously chosen so as to have a thermal conductivity substantially equal to that of the readout substrate 10, in order to improve the thermal link to the compensation transducer. Conductive pads 22 are then formed through the insulating layer 21 so as to open out onto the conductive portions 15.1 for biasing the compensation device. The conductive pads 22 may be formed by CVD deposition of a bonding thin film, for example made from TiN, followed by electrolytic deposition of copper. A chemical-mechanical polishing step makes it possible to make the conductive pads 22 flush with the planar upper face 20a of the interlayer 20.

With reference to FIG. 3B, the compensation transducer 40 is then produced, here in the form of a portion of a suitable thermistor material, by deposition, photolithography and then etching. The thermistor material may be amorphous silicon, a vanadium oxide, or any other equivalent material. The thermistor portion 40 may be dimensioned, notably in terms of thickness, so as to have predetermined electrical and/or thermal properties that are preferably substantially identical to those of the thermal detector.

The compensation transducer 40 may then be coated with a protective layer 31 in order to preserve its properties during the following step or steps. This protective layer 31 may be deposited conformally and be formed of a dielectric material chosen from among an aluminum oxide (for example $Al_2O_3$) or hafnium oxide (for example $HfO_2$), an aluminum nitride AlN, or the like.

An insulating encapsulating layer 32 is then deposited so as to cover the compensation transducer 40 and the interlayer 20. The insulating encapsulating layer 32 may be formed of a dielectric material, for example a silicon oxide, and preferably has a substantially planar upper face. The dielectric material is advantageously chosen so as to have a thermal conductivity substantially equal to that of the readout substrate 10, and in particular to the upper layers of the substrate 10, for example of the order of 130 W/m·K.

With reference to FIG. 3C, the reflector 51 of the thermal detector is then produced, here in the form of a portion made of at least one metal material. The reflector 51 is formed by deposition, photolithography and then etching. The metal material may be chosen from among copper, aluminum, platinum, gold, etc. The reflector 51 is situated facing the compensation transducer 40 along the Z axis and has a surface area in the XY plane substantially equal to or even greater than that of the compensation transducer 40. It is arranged so as to make said compensation transducer optically insensitive to the incident electromagnetic radiation.

It is then possible to deposit an etch stop layer 52 so as to cover the reflector 51 and the insulating encapsulating layer 32. This etch stop layer 52 is made from a material that is substantially inert to chemical etching carried out subsequently in order to eliminate the mineral sacrificial layer or layers, such as chemical etching in a vapor-phase HF medium. The etch stop layer 52 thus makes it possible to avoid the underlying mineral insulating layers 13, 21, 32 being etched during this step of eliminating the sacrificial layers. It may be formed of an aluminum oxide or nitride, aluminum trifluoride, or unintentionally doped amorphous silicon. It may be deposited conformally, for example by ALD (for Atomic Layer Deposition), and may have a thickness of the order of around ten nanometers to a few hundred nanometers. It is at least partially transparent to the incident electromagnetic radiation. As a variant, the etch stop layer 52 may extend continuously in contact with the encapsulating layer 32, and the reflector 51 may rest on the etch stop layer 52.

Figure 3D:
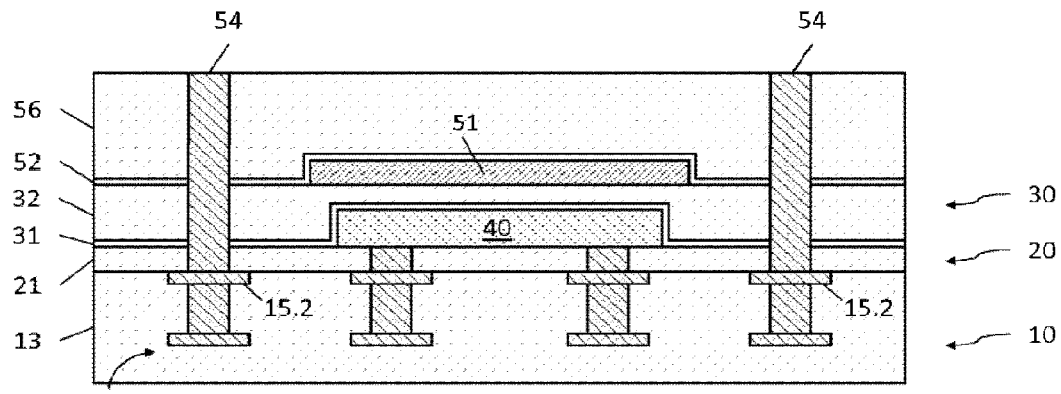

With reference to FIG. 3D, a sacrificial layer 56 is then deposited on the etch stop layer 52, here a layer of mineral dielectric material, for example a silicon oxide $SiO_x$ deposited by plasma-enhanced chemical vapor deposition (PECVD). This mineral material is able to be eliminated by wet chemical etching, in particular by chemical attack in an acid medium, the etchant preferably being vapor-phase hydrofluoric acid (HF). This mineral sacrificial layer 56 is deposited so as to extend continuously over substantially the entire surface of the readout substrate 10 and thus cover the etch stop layer 52. It has a thickness, in the Z axis, which contributes to subsequently defining the height of the quarter-wave interference cavity.

Vertical orifices that are intended to form the anchoring pillars 54 are then produced. They are produced by photolithography and etching, and pass through the mineral sacrificial layer 56, the etch stop layer 52, the insulating encapsulating layer 32, the protective layer 31 (if applicable) and the interlayer 20, so as to open out onto the conductive portions 15.2 of the readout circuit 12. The vertical orifices may have a square, rectangular or circular cross section in the (X,Y) plane, with a surface area substantially equal for example to 0.25 μm². The anchoring pillars 54 are then produced in the vertical orifices. They may be produced by filling the orifices with one or more electrically conductive materials. By way of example, they may each comprise a layer of TiN deposited by MOCVD (for Metal Organic Chemical Vapor Deposition) on the vertical sidewalls of the orifices, and a copper or tungsten core filling the space defined transversely by the layer of TiN. A CMP step then makes it possible to polish the upper face formed by the sacrificial layer 56 and the anchoring pillars 54.

Figure 3E:
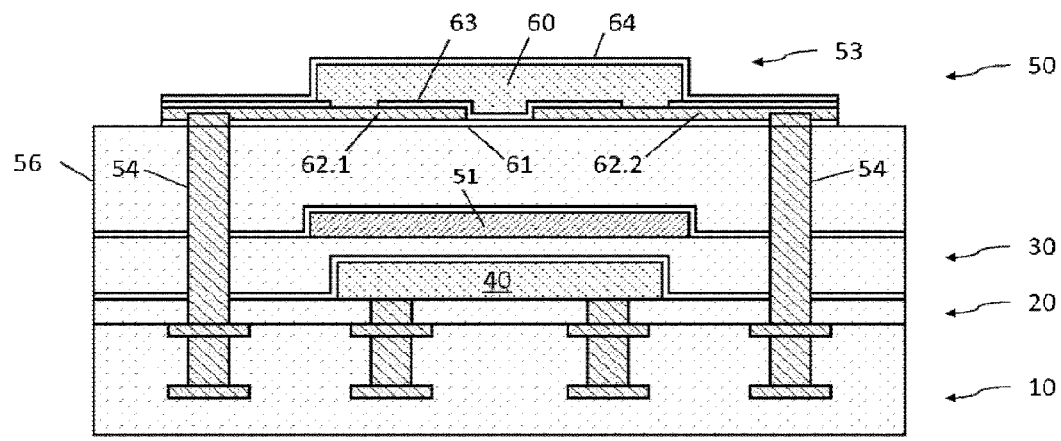

With reference to FIG. 3E, the absorbent membrane 53 of the thermal detector is then produced. The absorbent membrane 53 is produced here by deposition, photolithography and etching steps. It may thus be formed of a stack of:
  a lower insulating layer 61, formed for example of a thin sub-film for protection against chemical etching performed subsequently, for example made of $Al_2O_3$, $HfO_2$ or AlN with a thickness of between 10 nm and 50 nm, and a passivation sublayer, for example made of SiN with a thickness of between 10 nm and 30 nm;
  two electrodes 62.1, 62.2 that are substantially coplanar and electrically insulated from one another, made from at least one material able to absorb the electromagnetic radiation to be detected, for example made of Ti, TiN, TaN, WN or the like, and having an electrical resistance of the order of 377Ω per square. The thickness may be between 3 nm and 20 nm. The electrodes 62.1, 62.2 each make contact with an anchoring pillar 54 and are separated from one another in the XY plane by a distance preferably less than λ/5 or even less than 1 μm so as not to interfere with the absorption of the electromagnetic radiation to be detected with a center wavelength λ;

an intermediate insulating layer 63, made from a dielectric material, for example made of $Al_2O$, $HfO_2$ or AlN, and covering the electrodes 62.1, 62.2 and the lateral spacing between them, apart from at apertures opening out onto the electrodes;

a portion 60 made of a thermistor material, for example made of amorphous silicon or of a vanadium oxide or titanium oxide, with a thickness for example of between 50 nm and 200 nm, the thermistor portion 60 being in electrical contact with the electrodes 62.1, 62.2 via the apertures;

an upper insulating passivation layer 64, for example made of SiN with a thickness of between 10 nm and so nm, covering the thermistor portion 60.

Figure 3F:
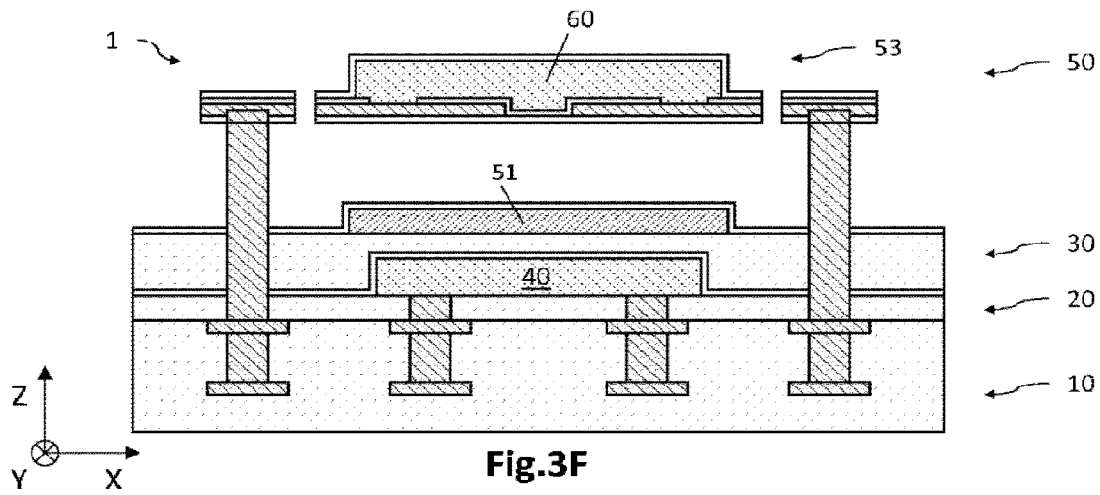

With reference to FIG. 3F, the holding arms (not shown) are produced by localized etching of the stack obtained beforehand, and the absorbent membrane 53 is then suspended. The suspension may be performed after having encapsulated the thermal detector 50 in a housing (not shown) defining a cavity that is intended to be hermetic. The suspension may be achieved by chemically etching the mineral sacrificial layer 56, here by wet chemical etching through a vapor-phase hydrofluoric acid attack.

The method illustrated in FIGS. 3A to 3F thus makes it possible to obtain a detection system 1 in which the thermal detector 50 and the compensation device 30 are arranged substantially vertically in the same sensitive pixel. The compensation transducer 40 has an improved thermal link to the readout substrate 10 while at the same time being made insensitive to the incident electromagnetic radiation by the reflector 51. The measurement of the effective common mode relating to the sensitive pixel is then made more accurate, thereby making it possible to efficiently determine the useful part of the response signal from the thermal detector 50.

In this example, the manufacturing method is monolithic, that is to say it comprises a sequence of deposition, photolithography and etching steps, performed from the same readout substrate. Unlike the method according to the second embodiment described further below, it does not comprise producing a plurality of functionalized substrates that are separate from one another and fastened together by direct bonding.

Of course, the method may allow the collective manufacture of a plurality of sensitive pixels arranged in a matrix. Each sensitive pixel may comprise a compensation device 30 situated underneath the reflector 51 of the thermal detector 50 and having an improved thermal link to the compensation transducer 40.

Generally speaking, as already mentioned, the compensation transducer and the detection transducer may be a thermistor material, a p-n junction or PIN (diode), a MOSFET transistor, or any other element having a temperature-sensitive electrical property. The compensation and detection transducers may or may not be of the same type, or even be identical or non-identical.

It is advantageous for the transducer of the detection device and that of the compensation device to be a MOSFET transistor, which is designed to operate in weak inversion mode and saturation mode. Such a detection transducer is described in document WO2018055276. Specifically, the TCC coefficient (Temperature Coefficient of Current) of such a transducer may be particularly high, for example of the order of 10%/K. The TCC coefficient is the equivalent of the TCR coefficient for a bolometric detector, and is defined as being the relative variation in the electric current between the source and the drain IDS as a function of temperature. A more precise definition of the TCC coefficient is given in the document by E. Fuxa, entitled *Etude théorique du dimensionnement d'une matrice bolométrique au pas de 5 μm, par report de dispositifs SOI sur structures suspendues pour des applications dans l'imagerie infrarouge non refroidie* [*Theoretical study of the dimensioning of a bolometric matrix at 5 μm intervals, by transferring SOI devices to suspended structures for applications in uncooled infrared imaging*], doctoral thesis defended on Dec. 15, 2016.

Figure 4:
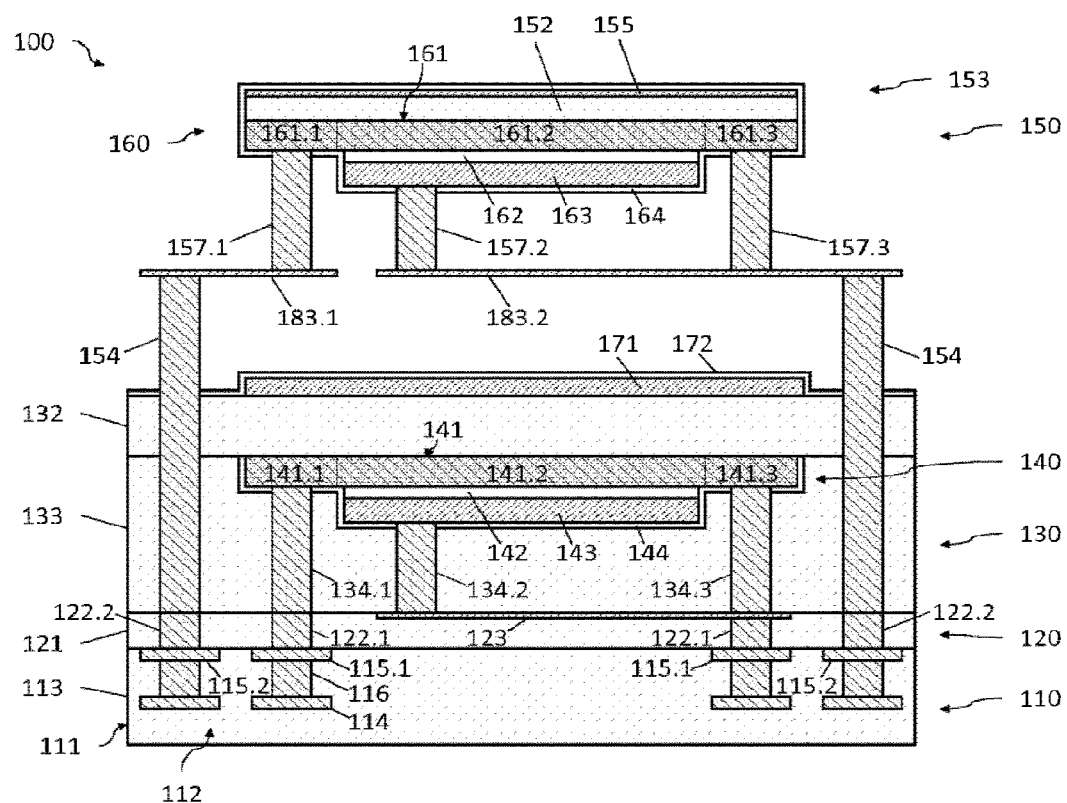
FIG. 4 is a schematic and partial cross-sectional view of a detection system according to a second embodiment.
Figure 4:
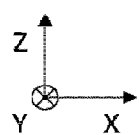

In this respect, FIG. 4 is a schematic and partial cross-sectional view of a detection system 100 according to a second embodiment. This detection system 100 is preferably used in simultaneous read mode on the sensitive pixels (snapshot mode) due notably to the fact that the electric currents flowing through the transducers are generally of the order of a few nanometers. It may however also be used in row-by-row read mode (rolling shutter mode).

The detection system 100 is obtained through a method comprising steps of producing various separate functionalized substrates, which are then fastened together preferably through mixed bonding, also called hybrid bonding (wafer bonding), which combines thermocompression bonding between metal conductive portions, which may be made notably from copper, with direct bonding, which involves Van der Waals forces between dielectric surfaces, for example made from silicon oxide.

The detection system 100 comprises a first functionalized substrate 110, called readout substrate, corresponding to a support substrate 111 containing the readout circuit 112. This structure is identical or similar to the one described above, and is not detailed again here. It comprises an upper face 110a that is flush with a surface of a dielectric material and a surface of conductive portions 115.1, 115.2 for biasing the compensation transducer 140 and the detection transducer 160.

The detection system 100 comprises a second functionalized substrate 130, called compensation substrate. The compensation substrate 130 is fastened, here by mixed bonding, to the readout substrate 110. It comprises the compensation transducer 140, which here is a MOSFET transistor whose source 141.1, gate 143 and drain 141.3 are electrically connected to the readout circuit 112 via conductive pads 134.1, 134.2, 134.3. In this example, the gate 143 and the drain 141.3 are brought to the same electrical potential by way of a lateral connecting arm 123 connecting the conductive pad 134.2 for connecting the gate 143 and the conductive pad 134.3 for connecting the drain 141.3 to the same conductive pad 122.1.

More specifically, the compensation substrate 130 here comprises a connection interlayer 120 (optional) comprising conductive pads 122 for biasing the compensation transducer 140 and the detection transducer 160, and a lateral connecting arm 123. These conductive pads 122 extend in an insulating layer 121 made from a dielectric material. The interlayer 120 has a substantially constant thickness, such that its lower and upper faces are substantially parallel and coplanar. The dielectric material advantageously has a thermal conductivity substantially equal to that of the readout substrate 110. The lateral connecting arm 123 extends in the XY plane level with the upper face of the insulating layer 121, and is made from at least one electrically conductive material.

The compensation transducer 140 here is a MOSFET transistor. It comprises a semiconductor portion 141 made from a semiconductor material, for example made of silicon. It has a first doped region 141.1, called source, and a second doped region 141.3, called drain. The source 141.1 and the drain 141.3 are regions doped with a first conductivity type, for example of n-type or p-type. They are separated from one another by an intermediate region 141.2, called channel, which is either fully depleted or doped with a second conductivity type opposite the first type. An insulating layer 142, usually called gate oxide, extends over part of the lower face of the semiconductor portion 141, and is formed of at least one electrically insulating material, for example a silicon oxide. The insulating layer 142 coats a conductive layer 143 forming the gate electrode, which is formed of at least one electrically conductive material.

In this example, an etch stop layer 144 may cover the lower face that is left free and the sidewalls of the compensation transducer 140. This etch stop layer 144 is present notably when this functionalized substrate is produced collectively and is intended to form either the compensation substrate 130 or the detection substrate 150.

A first conductive pad 134.1 extends along the Z axis between the source 141.1 and a conductive pad 122.1 and creates the electrical connection between them. A second conductive pad 134.2 extends along the Z axis between the gate 143 and the lateral connecting arm 123 and creates the electrical connection between them, and a third conductive pad 134.3 extends along the Z axis between the drain 141.3 and the same lateral connecting arm 123 and electrically connects them. The conductive pads 134 are made from at least one electrically conductive material.

The compensation transducer 140 and the conductive pads 134 are encapsulated in the XY plane by at least one insulating layer 132, 133 whose thickness is substantially constant, such that the upper and lower faces of the compensation substrate 130 are substantially parallel and planar. A first insulating layer 133 extends here from the interlayer 120 to the upper face of the semiconductor portion 141. A second insulating layer 132 covers the first insulating layer 133 as well as the compensation transducer 140. It has a substantially planar upper face. These two insulating encapsulating layers 132, 133 are made from a dielectric material whose thermal conductivity is advantageously equal to that of the readout substrate 110, so as to improve the thermal link between the compensation transducer 140 and the readout substrate 110.

The detection system 100 comprises a thermal detector, originating from a third functionalized substrate 150, called detection substrate (presented further below). In this example, the thermometric transducer 160 of the thermal detector 150 is a MOSFET transistor identical or similar to the compensation transducer 140.

The thermal detector 150 comprises a reflector 171 formed of a portion made from at least one reflective material, for example a metal material, resting on the insulating encapsulating layer 132. The reflector 171 is situated facing, about the Z axis, the compensation transducer 140 so as to make it insensitive to the incident electromagnetic radiation. It has a surface area, in the XY plane, preferably greater than or equal to that of the compensation transducer 140.

In this example, an etch stop layer 172 extends so as to cover the insulating encapsulating layer 132, and also covers the reflector 171 here. The etch stop layer 172 is required when it is necessary to protect the underlying insulating layers 113, 121, 132, 133 during a step of suspending the detection transducer 160 performed by wet etching of a mineral sacrificial layer, for example by vapor-phase HF etching.

The thermal detector 150 comprises an absorbent membrane 153 suspended above the reflector 171, here by way of anchoring pillars 154, lateral connecting arms 183 and conductive pads 157. This absorbent membrane 153 comprises the detection transducer 160 associated with an absorber for absorbing the electromagnetic radiation to be detected.

The anchoring pillars 154 are conductive pads made from at least one electrically conductive material that extend along the Z axis to an end in contact with the conductive pads 122.2 of the connection interlayer 120.

From the other end of the anchoring pillars 154, lateral connecting arms 183.1, 183.2 extend in the XY plane and are made from at least one electrically conductive material. They are intended to keep the absorbent membrane 153 suspended, and to allow the electrical connection of the detection transducer 160. In this example, the lateral connecting arm 183.2 brings the gate 163 and the drain 161.3 of the MOSFET transistor to the same electrical potential.

The detection transducer 160 comprises a semiconductor portion 161 having a first doped region 161.1, called source, a second doped region 161.3, called drain, and an intermediate region 161.2, called channel. The two doped regions 161.1, 161.3 have a first conductivity type, for example n-type or p-type, and the channel 161.2 is a fully depleted region, or even a region having a second conductivity type opposite the first type. An insulating layer 162, called gate oxide, extends over part of the lower face of the semiconductor portion 161, and is formed of at least one electrically insulating material. The insulating layer 162 coats a conductive layer 163 forming a gate electrode, which is formed of at least one electrically conductive material. The source 161.1, the gate 163 and the drain 161.3 are in electrical contact with, respectively, first, second and third conductive pads 157.1, 157.2, 157.3.

A first conductive pad 157.1 thus extends along the Z axis from a first lateral connecting arm 183.1 to the source 161.1 of the detection transducer 160. It is advantageously coaxial here with the conductive pad 134.1 for connecting the source 141.1 of the compensation transducer 140. A second conductive pad 157.2 extends along the Z axis from the second lateral connecting arm 183.2 to the gate electrode 163. It is advantageously coaxial here with the conductive pad 134.2 for connecting the gate 143 of the compensation transducer 140. A third conductive pad 157.3 extends along the Z axis from the same second lateral connecting arm 183.2 to the drain 161.3. It is advantageously coaxial here with the conductive pad 134.3 for connecting the drain 141.3 of the compensation transducer 140.

In this example, the upper face of the semiconductor portion 161 is preferably coated with an upper insulating layer 152 that separates the semiconductor portion 161 from an absorbent upper layer 155 for absorbing the electromagnetic radiation to be detected. In one variant, not shown, this absorbent layer 155, when it is electrically connected to the readout circuit 112, may contribute to adjusting the threshold voltage of the MOSFET transistor.

Finally, an etch stop layer 164 here covers the detection transducer 160 as well as the insulating layer 152 and the upper absorbent layer 155. This etch stop layer 164 makes it possible notably to preserve this assembly during a step of suspending the structure by chemical etching of a mineral sacrificial layer, for example by vapor-phase HF etching.

The detector system 100 thus has the advantage of comprising, at the sensitive pixel, a compensation transducer 140 arranged to the right, along the Z axis, of the detection transducer 160. The compensation transducer 140 is made insensitive to the incident electromagnetic radiation due to the presence of the reflector 171, on the one hand, and thermally linked to the readout substrate 110, on the other hand. The thermal link between the compensation transducer 140 and the readout substrate 110 is improved when the insulating encapsulating layers 132, 133, as well as the insulating layer 121 of the interlayer 120, have a thermal conductivity substantially equal to that of the readout substrate 110. Furthermore, the fill factor is low, such that the sensitive pixel may have lateral dimensions, in the XY plane, of the order of 5 μm.

In addition, the compensation 140 and detection 160 MOSFET transistors are advantageously designed here to operate in weak inversion mode, through the application of a voltage $V_{GS}$ of the order of 50 mV to 75 mV, and in saturation mode via the voltage $V_{DS}$ of the same order of magnitude, thus making it possible to obtain a particularly high TCC coefficient, for example of the order of 10%/K$^{-1}$. These weak inversion and saturation modes are obtained easily by bringing the gate and the drain to the same electrical potential. The fact that the voltages $V_{GS}$ and $V_{DS}$ are equal and of low intensity makes it possible to limit Joule losses, the self-heating of the absorbent membrane, thereby making it possible to increase the signal-to-noise ratio (SNR).

In addition, the fact that the gate 163 and the drain 161.3 are brought to the same electrical potential by the same lateral connecting arm 183.2 makes it possible to improve the thermal insulation of the absorbent membrane 153 insofar as two electrical connections instead of three bias the thermal detector.

Moreover, the quarter-wave interference cavity may be formed between the reflector 171 and the conductive gate layer 163, or between the reflector 171 and the upper conductive layer 155. The latter may be electrically connected such that it is possible to adjust the threshold voltage of the transistor by introducing fixed charges into the insulating layer 152.

FIGS. 5A to 5H illustrate various steps of a method for manufacturing the detection system 100 according to the second embodiment. This method differs essentially from the one illustrated in FIGS. 3A to 3F in that it comprises steps of producing various separate functionalized substrates, which are then fastened together, notably by a mixed bonding technique.

Figure 5A:
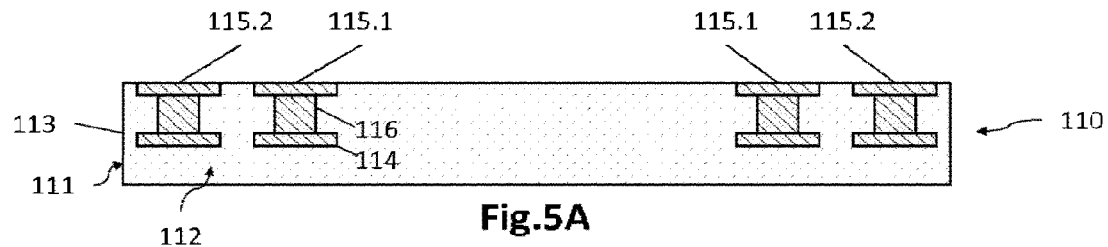
FIGS. 5A to 5H illustrate various steps of a method for manufacturing the detection system according to the second embodiment.

With reference to FIG. 5A, a first functionalized substrate 110, called readout substrate, is produced. It comprises a support substrate 111 containing the readout circuit 112, designed to control and read the compensation device 130 and the thermal detector 150. The readout circuit 112 thus comprises conductive portions 115.1, 115.2 that are flush with the upper face of the support substrate 111, which is substantially planar. The conductive portions 114, 115 and the conductive vias 116 may be made from copper, aluminum or tungsten, inter alia, for example using a damascene method in which trenches formed in the inter-metal dielectric layer are filled. The conductive portions 115 may be made flush with the upper face of the readout substrate 110 using a chemical-mechanical polishing (CMP) technique.

Figure 5B:
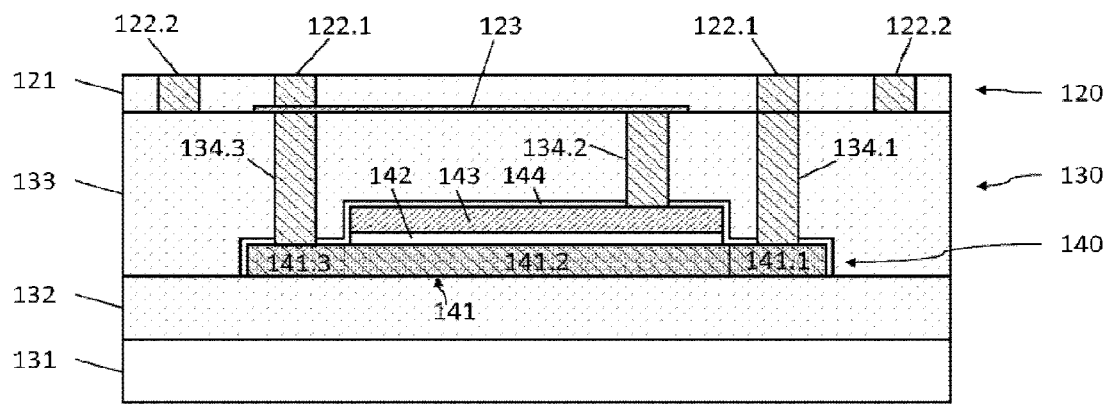

With reference to FIG. 5B, a second functionalized substrate 130, called compensation substrate, is produced. The compensation substrate 130 comprises a stack of a support substrate 131, made for example from silicon, an insulating layer 132 and a semiconductor portion 141. This stack may be obtained from an SOI substrate whose semiconductor portion 141 is formed by photolithography and etching of the silicon thin film. The insulating layer 132 is made from a dielectric material, for example a silicon oxide, and has a thickness of for example between 20 nm and 145 nm. The semiconductor portion 141 is made from a semiconductor material, for example from silicon, and has a thickness of for example between 20 nm and 70 nm. The semiconductor material is advantageously fully depleted (FDSOI substrate, for Fully Depleted Silicon On Insulator).

An insulating layer 142 (gate oxide) is formed on part of the free face of the semiconductor portion 141, and is made from at least one dielectric material. It may be formed of a stack of an $SiO_2$ sublayer with a thickness of between 3 nm and 30 nm, obtained by thermal oxidation of the silicon of the semiconductor portion, and an $HfO_2$ sublayer with a thickness of between 2 nm and 10 nm, obtained by ALD (Atomic Layer Deposition).

A conductive layer 143 forming a gate electrode is formed on the free face of the insulating layer 142, and is made from at least one electrically conductive material. It may be formed of a stack of a TiN sublayer with a thickness of between 5 nm and 20 nm, deposited for example by physical vapor deposition (PVD), and a polycrystalline silicon sublayer with a thickness of between 30 nm and 100 nm, obtained by LPCVD (Low Pressure Chemical Vapor Deposition).

The steps of producing the gate oxide 142 and the gate electrode 143 usually bring the structure to a temperature above 400° C., for example of the order of 950° C. for the formation of the thermal $SiO_2$ and of the order of 650° C. for the formation of the polycrystalline silicon. Since these temperatures are higher than the value of 400° C., corresponding substantially to the thermal budget of the CMOS readout circuit, they mean that the compensation device 130 is produced via a functionalized substrate separate from the readout substrate 110.

The insulating layer 142 and the gate 143 are structured by photolithography and etching such that they cover only part of the free face of the semiconductor portion 141, thus allowing electrical contact at doped lateral regions of the semiconductor portion 141 forming the source 141.1 and the drain 141.3 of the transistor.

The source 141.1 and the drain 141.3 are formed by ion implantation of dopants in the regions of the semiconductor portion 141 that are not covered by the gate 143. They have the same first conductivity type, for example n-type or p-type. The channel 141.2 is fully depleted, or even has a second conductivity type opposite the first type. The upper free face of the source 141.1, that of the gate 143 and that of the drain 141.3 may be coated with a metal thin film (not shown), for example of nickel and TiN, deposited by PVD, followed by a silicidation phase such that the regions of unreacted Ni and TiN are then eliminated. Thus, only the upper faces of the source 141.1, of the gate 143 and of the drain 141.3 are coated with the metal thin film. This metal thin film makes it possible to improve electrical contact with the conductive pads 134 described further below.

In this example, an etch stop layer 144 may cover the sidewalls and the free face of the semiconductor portion 141, of the insulating layer 142 (sidewalls), and of the gate 143. This etch stop layer 144 is present when, during the manufacturing method, this functionalized substrate is produced in order to form either the compensation substrate or the detection substrate, these two functionalized substrates then having a structurally identical transducer. The etch stop layer 144 is made from a material that is substantially inert to an etchant used during a step of suspending the absorbent membrane of the thermal detector by wet etching of a mineral sacrificial layer, for example by vapor-phase HF etching. The inert material may be for example $Al_2O_3$, AlN or $HfO_2$.

An insulating encapsulating layer 133, made from a dielectric material, is then deposited so as to cover the compensation transducer 144 thus formed. A chemical-mechanical polishing (CMP) step is then performed so as to make the upper free face substantially planar. The dielectric material of the insulating encapsulating layer 133 preferably has a thermal conductivity substantially equal to that of the readout substrate 110, thus improving the thermal link between the compensation transducer 140 and the readout substrate 110. The dielectric material may be for example a silicon oxide or a silicon nitride.

Conductive pads 134 are then produced, so as to allow electrical contact with the source 141.1, the gate 143 and the drain 141.3. To this end, orifices are formed through the insulating encapsulating layer 133 and the etch stop layer 144 (if applicable), so as to open out onto the upper free face of the source 141.1, of the gate 143 and of the drain 141.3. The conductive pads 134 are produced by depositing at least one conductive material, for example through successive depositions of titanium Ti, titanium nitride TiN and tungsten W, followed by chemical-mechanical polishing so as to make the upper face substantially planar.

The interlayer 120 is then produced from the upper face of the structure that is obtained. The lateral connecting arm 123 is thus first of all produced by depositing at least one electrically conductive material, so as to be in electrical contact with the conductive pads 134.2, 134.3 for connecting the gate 143 and the drain 141.3. Then, an insulating layer 121 made from a dielectric material, for example a silicon oxide or a silicon nitride, is deposited so as to cover the structure that is obtained. Conductive pads 122.1, 122.2 are then produced through the insulating layer 121, by producing through-orifices, depositing at least one electrically conductive material, and then chemical-mechanical polishing. In this example, two conductive pads 122.2 are intended to be in contact with the conductive portions 115.2 for biasing the thermal detector 150, and two conductive pads 122.1 are intended to be in contact with the conductive portions 115.1 for biasing the compensation device 130. These conductive pads 122.1 are in electrical contact with the lateral connecting arm 123 and the conductive pad 134.1 for connecting the source 141.1.

Figure 5C:
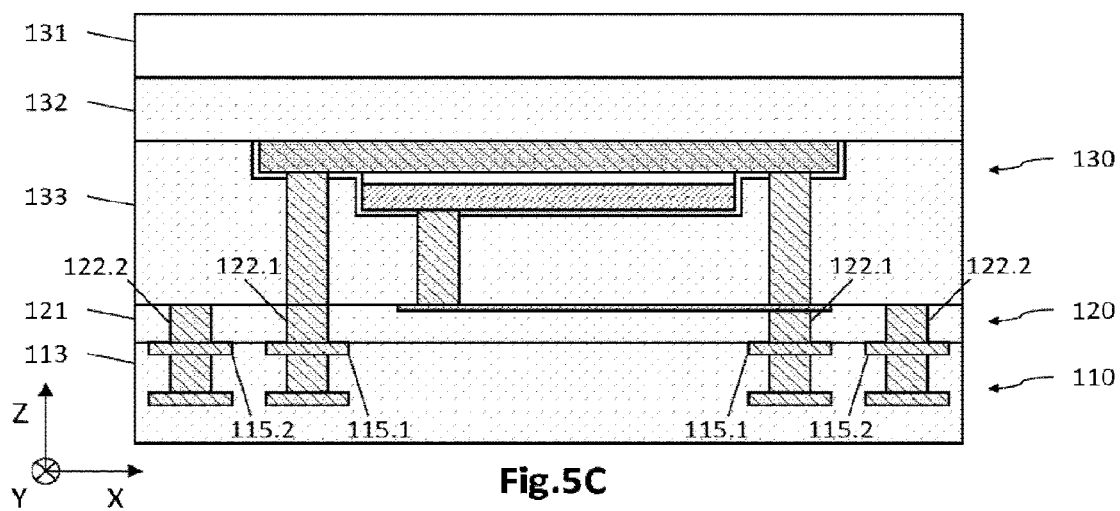

With reference to FIG. 5C, the compensation substrate 130 thus obtained is then fastened to the readout substrate 110. To this end, the free upper face of the compensation substrate 130 is put into contact with the free upper face of the readout substrate 110. The conductive pads 122.1 are put into contact with the conductive portions 115.1, and the conductive pads 122.2 are put into contact with the conductive portions 115.2. The two functionalized substrates are preferably fastened using mixed bonding technology.

Figure 5D:
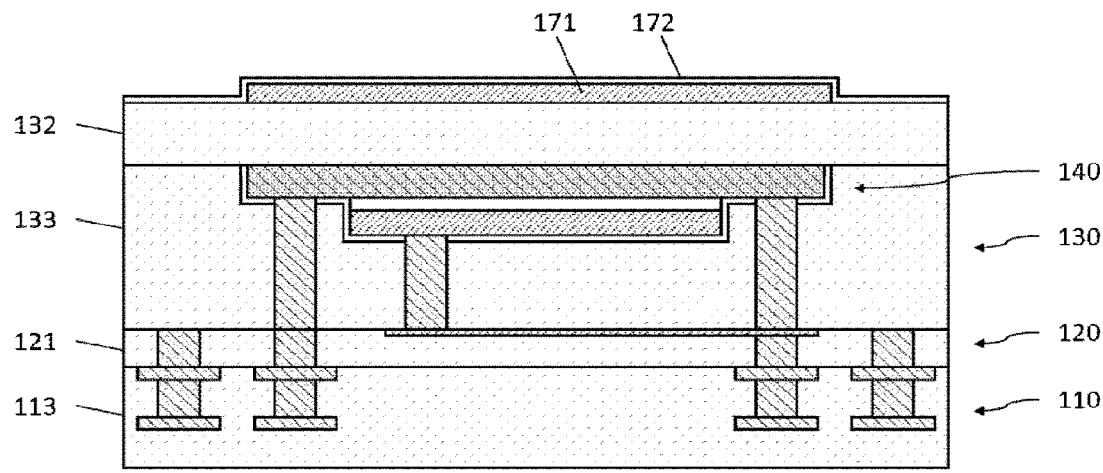

With reference to FIG. 5D, the support substrate 131 is then eliminated from the compensation substrate 130, for example by grinding. The insulating layer 132 may or may not be thinned. An optical spacing interlayer 170 is then produced, which comprises the reflector 171 and contributes to defining the size of the quarter-wave interference cavity. The reflector 171 is then produced on the upper face of the structure thus obtained. To this end, at least one material reflecting the incident electromagnetic radiation is deposited, for example aluminum Al, aluminum copper AlCu, copper Cu, gold Au, etc. This layer is then structured by photolithography and etching so as to be situated facing the compensation transducer 140, with the aim of making it optically insensitive to the incident electromagnetic radiation.

An etch stop layer 172 is then produced so as to cover the insulating layer 132. In this example, it also coats the reflector 171, but, as a variant, it may extend continuously over the insulating layer 132 and be locally coated by the reflector 171. This etch stop layer 172 is required when the absorbent membrane 153 of the thermal detector 150 is suspended by wet etching of a mineral sacrificial layer, for example by vapor HF etching. The etch stop layer, made for example from $Al_2O_3$ or AlN or $HfO_2$, is substantially inert to the etchant and protects the underlying mineral insulating layers.

Figure 5E:
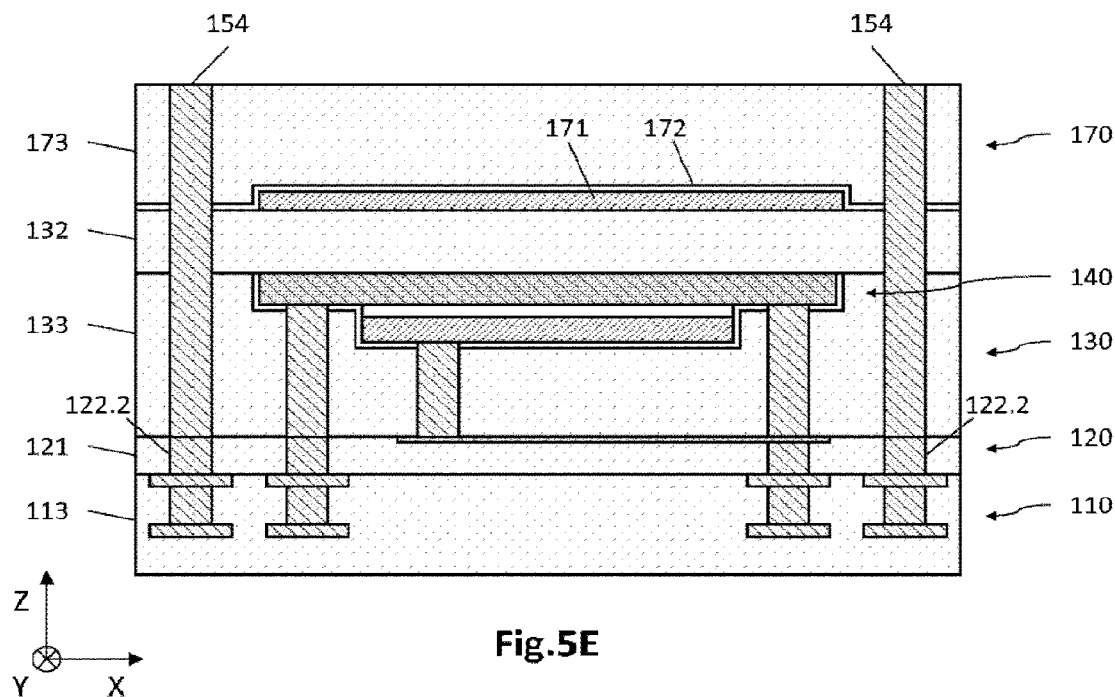

With reference to FIG. 5E, part of the quarter-wave interference cavity as well as some of the anchoring pillars are produced. To this end, a sacrificial layer 173 is deposited so as to cover the etch stop layer 172 and the reflector 171, followed by chemical-mechanical polishing to make the upper face substantially planar. This may be made from a mineral material, for example a silicon oxide, and have a thickness of between 1.5 μm and 2.5 μm in the case of the detection of infrared radiation of between 8 μm and 14 μm (LWIR range). The anchoring pillars 154 are produced by forming apertures passing through the sacrificial layer 173, the etch stop layer 172, the insulating layers 132, 133, so as to open out onto the conductive pads 122.2, followed by deposition of at least one conductive material, for example a metal bond layer and copper. A chemical-mechanical polishing step is performed in order to make the upper face substantially planar. The stack thus obtained forms an optical spacing interlayer 170. It therefore comprises the reflector 171, the etch stop layer 172 and the sacrificial layer 173. It is passed through by the anchoring pillars 154.

Figure 5F:
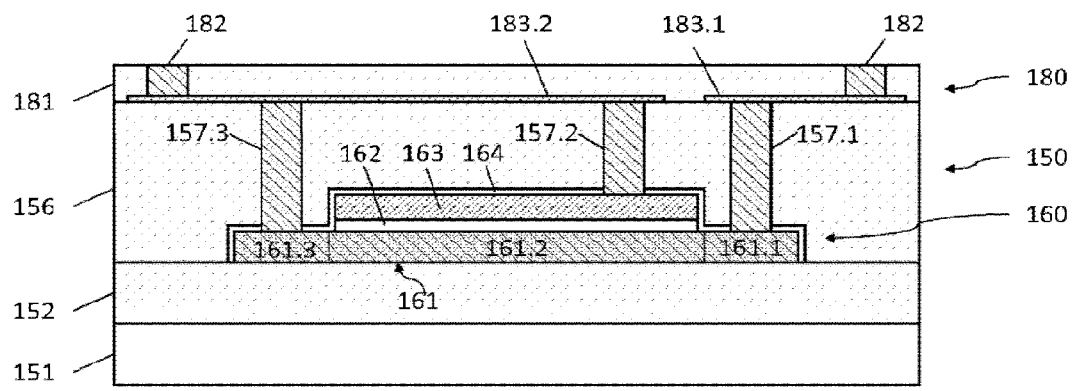

With reference to FIG. 5F, a third functionalized substrate 150, called detection substrate, is produced. In this example, this detection substrate 150 has a transducer identical to that of the compensation substrate 140. It is therefore not described again in detail. The detection transducer 160 is formed from an SOI substrate, and preferably an FDSOI substrate. It rests on an insulating layer 152, which covers a support substrate 151. It is formed, as described above, of a semiconductor portion 161 comprising a first region 161.1 doped with a first conductivity type and forming the source, a second region 161.3 doped with the first conductivity type and forming the drain, and an intermediate region 161.2 that is fully depleted or doped with the second conductivity type and forming the channel. The channel 161.2 is covered with a conductive layer 163 forming the gate, and with an insulating layer 162 interposed between the gate 163 and the channel 161.2. The detection transducer 160 is advantageously produced in a manner identical or similar to the compensation transducer 140, such that they have substantially identical thermoelectric properties.

As mentioned above, the production of the gate oxide 162 and of the gate electrode 163 usually bring the structure to a temperature higher than 400° C., which means that the thermal detector 150 is produced via a functionalized substrate separate from the readout substrate 110.

Here, an etch stop layer 164 covers the sidewalls and the free face of the semiconductor portion 161, of the insulating layer 162 and of the gate 163. This etch stop layer 164 is present here insofar as the absorbent membrane 153 containing the detection transducer 160 is intended to be suspended by etching sacrificial layers. The etch stop layer 164 is made from a material that is substantially inert to the etchant used during this step of suspending the absorbent membrane, for example by vapor-phase HF etching. The inert material may be for example $Al_2O_3$, AlN or $HfO_2$.

A sacrificial layer 156, made for example from a mineral dielectric material, is then deposited so as to cover the detection transducer 16 thus formed. A chemical-mechanical polishing (CMP) step is then performed so as to make the upper face substantially planar. The material of the sacrificial layer 156 may be for example a silicon oxide or a silicon nitride.

Conductive pads 157 are then produced, so as to allow electrical contact with the source 161.1, the gate 163 and the drain 161.3. To this end, orifices are formed through the sacrificial layer 156 and the etch stop layer 164, so as to open out onto the upper free face of the source 161.1, of the gate 163 and of the drain 161.3. The conductive pads 157 are produced by depositing at least one conductive material, for example through successive depositions of titanium Ti, titanium nitride TiN and tungsten W, followed by chemical-mechanical polishing so as to make the upper face substantially planar.

The connection interlayer 180 is then produced from the upper face of the structure that is obtained. This interlayer 180 is required when the detection transducer 160 has a structure identical to that of the compensation transducer 140, in particular when the connection pads 157 and the connection pads 134 are coaxial in pairs. It then comprises at least two lateral connecting arms 183.1, 183.2 that make it possible to laterally offset the electrical contact of the conductive pads 157 for connecting the source, the gate and the drain.

A first lateral connecting arm 183.2 is thus first of all produced by depositing at least one electrically conductive material, so as to be in electrical contact with the conductive pads 157.2, 157.3 for connecting the gate 163 and the drain 161.3. A second lateral connecting arm 183.1 is then produced so as to be in electrical contact with the conductive pad 157.1 for connecting the source 161.1. Then, a sacrificial layer 181 made for example from a mineral dielectric material, for example a silicon oxide or a silicon nitride, is deposited so as to cover the structure that is obtained. Conductive pads 182 are then produced through the sacrificial layer 181, by producing through-orifices, depositing at least one electrically conductive material, and then chemical-mechanical polishing. In this example, two conductive pads 182 are intended to be in contact with the anchoring pillars 154. These conductive pads 182 are in electrical contact with the lateral connecting arms 183.

Figure 5G:
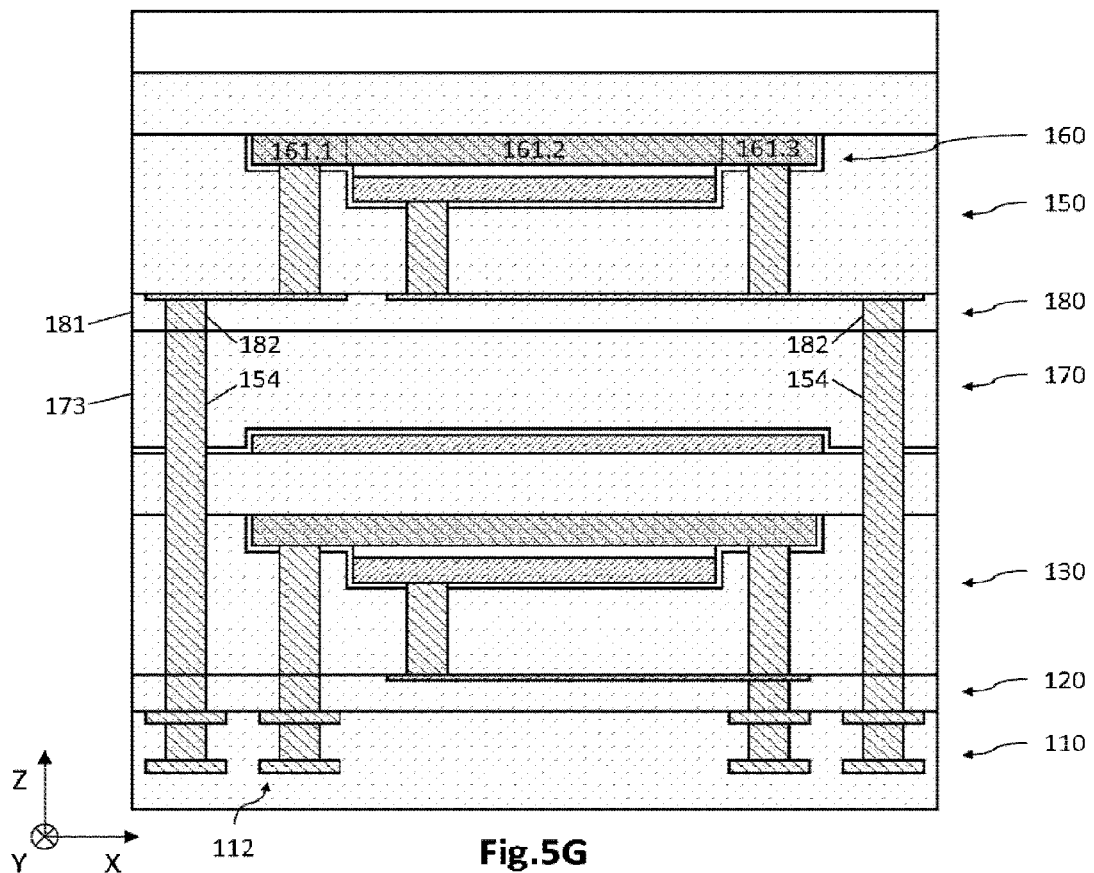

With reference to FIG. 5G, the detection substrate 150 thus obtained is then fastened to the structure formed of the readout and compensation substrates. To this end, the free upper face of the structure formed of the detection substrate 150 and of the connection interlayer 180 is put into contact with the free upper face of the readout and compensation structure, and more precisely of the optical spacing interlayer 170. The conductive pads 182 are put into contact with the anchoring pillars 154 so as to allow the thermal detector 150 to be electrically connected to the readout circuit 112. The dielectric surface of the sacrificial layer 181 is put into contact with the dielectric surface of the sacrificial layer 173. The detection substrate is preferably fastened to the readout and compensation structure by mixed bonding, as described above.

Figure 5H:
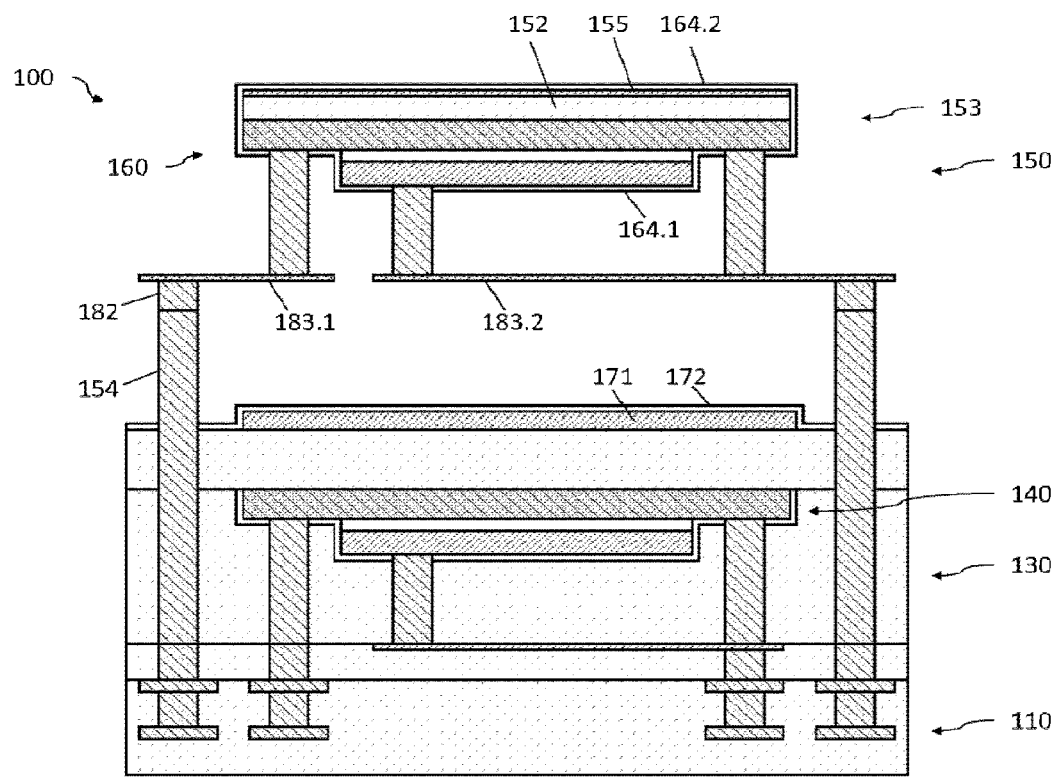

With reference to FIG. 5H, the support substrate 151 is eliminated, for example by grinding, and the insulating layer 152 may be thinned. An absorbent layer 155 may be deposited on the insulating layer 152, so as to improve the absorption of the electromagnetic radiation to be detected. The insulating layer 152 is then structured by photolithography and etching so as to extend, in the XY plane, only facing the semiconductor portion 161. An etch stop layer 164.2, preferably identical to the etch stop layer 164.1, is then deposited so as to continuously cover the free surface of the insulating layer 152 and of the absorbent layer 155. As a variant, the etch stop layer 164.2 may be deposited directly on the insulating layer 152 and be locally coated by the absorbent layer 155. As mentioned above, the absorbent layer 155 may be electrically connected to the readout circuit, so as to be able to adjust the threshold voltage of the transistor.

The absorbent membrane 153 of the thermal detector 150 is then suspended by etching the sacrificial layers 173, 181, 156. When these sacrificial layers are made from a mineral material, for example from a silicon oxide, the elimination may be performed by wet HF-vapor etching. The etch stop layer 172 makes it possible to preserve the underlying mineral layers, and the etch stop layer 164 protects the suspended membrane.

What has thus been produced is a sensitive pixel, and preferably a matrix of collectively sensitive pixels, having a vertical arrangement along the Z axis of a thermal detector 150, a reflector 171 and a compensation device 130. The compensation transducer 140 is thus made insensitive to the incident electromagnetic radiation by the reflector 171, and has a good thermal link to the readout substrate 110. The fill factor is thus increased, and the determination of the useful signal associated with the absorption of the electromagnetic radiation to be detected is made more accurate due to the fact that the compensation transducer 140 is situated in the sensitive pixel.

Some particular embodiments have just been described. Various variants and modifications will appear obvious to those skilled in the art.

The interlayer 120 has thus been produced from the compensation substrate 130, but could be produced from the readout substrate 110. Likewise, the interlayer 180 has been produced from the detection substrate 150, but could be produced from the structure formed of the compensation substrate bonded to the readout substrate.

More generally, the compensation transducer may be produced directly from the readout substrate, and for example be a thermistor material, and the detection transducer may be produced via a functionalized substrate transferred and then bonded to the structure formed of the compensation device and the readout substrate, and for example be a p-n junction or PIN diode or a transistor identical or similar to the one described above. As a variant, the compensation transducer may be produced via a functionalized substrate transferred and then bonded to the readout substrate, and for example be a p-n junction or PIN diode or a transistor identical or similar to the one described above, and the detection transducer may be produced directly from the structure formed of the compensation device and the readout substrate, and for example be a thermistor material.

The invention claimed is:

1. A system for detecting electromagnetic radiation, comprising:
   a readout substrate;
   at least one thermal detector, comprising:
      an absorbent membrane for absorbing the electromagnetic radiation, thermally insulated from the readout substrate, and comprising a thermometric detection transducer selected from among a p-n junction or PIN diode, a field-effect transistor, or a thermistor material, and a reflector for reflecting the electromagnetic radiation, arranged between the absorbent membrane and the readout substrate;

at least one compensation device, comprising:

a thermometric compensation transducer selected from among a p-n junction or PIN diode, a field-effect transistor, or a thermistor material, in thermal contact with the readout substrate; and a readout circuit, arranged in the readout substrate, and designed to apply an electrical signal to the thermal detector and to the compensation device, wherein the thermometric compensation transducer is:

arranged between the reflector and the readout substrate, and situated facing the reflector so as to be optically insensitive to incident electromagnetic radiation.

2. The detection system as claimed in claim 1, wherein the reflector covers the thermometric compensation transducer.

3. The detection system as claimed in claim 1, wherein the thermometric compensation transducer is in contact with the readout substrate through at least one insulating layer made from a dielectric material having a thermal conductivity substantially equal to that of the readout substrate.

4. The detection system as claimed in claim 1, wherein the thermometric compensation transducer is surrounded, in a plane parallel to the main plane of the readout substrate, by an insulating layer made from a dielectric material having a thermal conductivity substantially equal to that of the readout substrate.

5. The detection system as claimed in claim 4, wherein the reflector rests on an insulating layer made from a dielectric material having a thermal conductivity substantially equal to that of the readout substrate and that covers the thermometric compensation transducer.

6. The detection system as claimed in claim 1, wherein the thermometric compensation and detection transducers are structurally identical.

7. The detection system as claimed in claim 6, wherein the thermometric compensation and detection transducers are connected to the readout circuit via conductive pads extending substantially orthogonally to the main plane of the readout substrate, the conductive pads for connecting the thermometric detection transducer being substantially coaxial with the conductive pads for connecting the thermometric compensation transducer, and the conductive pads for connecting the thermometric detection transducer being electrically connected to anchoring pillars suspending the absorbent membrane via at least one lateral connecting arm extending in a plane parallel to the main plane of the readout substrate.

8. The detection system as claimed in claim 7, wherein the conductive pads for connecting the thermometric detection transducer each have a height substantially equal to that of the coaxial conductive pad for connecting the thermometric compensation transducer.

9. The detection system as claimed in claim 1, wherein the thermometric compensation and detection transducers are field-effect transistors each comprising a semiconductor portion forming a source, a channel and a drain, and a conductive layer forming a gate, which is separated from the channel by an insulating layer forming a gate oxide, each gate being situated, with respect to the corresponding semiconductor portion, on the side of the readout substrate.

10. The detection system as claimed in claim 9, wherein the thermometric compensation and detection transducers are connected to the readout circuit via conductive pads extending substantially orthogonally to the main plane of the readout substrate, and each connecting a source, a drain or a gate.

11. A method for manufacturing the detection system as claimed in claim 1, the thermometric compensation and detection transducers being thermistor materials, the method comprising:

producing the readout substrate;

producing the compensation device, from an upper face of the readout substrate;

producing the reflector, from an upper face of the compensation device; and producing the absorbent membrane of the thermal detector, from an upper face of the reflector.

12. A method for manufacturing the detection system as claimed in claim 1, the thermometric compensation and detection transducers being p-n junction or PIN diodes or field-effect transistors, the method comprising:

producing the readout substrate;

producing a functionalized compensation substrate, comprising the thermometric compensation transducer;

fastening the functionalized compensation substrate to the readout substrate by bonding;

producing a functionalized detection substrate, comprising the thermometric detection transducer; and fastening the functionalized detection substrate to the previously obtained structure by bonding.

13. The method as claimed in claim 12, wherein the readout, compensation, and detection substrates are fastened in pairs, through mixed bonding, at faces of said functionalized substrates that are defined by at least one surface of a dielectric material, and at least one surface of a metal material.

14. A method for manufacturing the detection system as claimed in claim 1, the thermometric compensation transducer being a thermistor material, and the thermometric detection transducer being a p-n junction or PIN diode or a field-effect transistor, the method comprising:

producing the readout substrate;

producing the compensation device, from an upper face of the readout substrate;

producing an optical spacer interlayer comprising the reflector, from an upper face of the compensation device;

producing a functionalized detection substrate, comprising the thermometric detection transducer; and fastening the functionalized detection substrate to the previously obtained structure by bonding.

* * * * *